(12) United States Patent
Bin et al.

(10) Patent No.: US 10,895,801 B2
(45) Date of Patent: Jan. 19, 2021

(54) GIMBAL STRUCTURE

(71) Applicant: SZ DJI OSMO TECHNOLOGY CO., LTD., Shenzhen (CN)

(72) Inventors: Peng Bin, Shenzhen (CN); Yongjie Huang, Shenzhen (CN); Tianhang Ma, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/675,775

(22) Filed: Nov. 6, 2019

(65) Prior Publication Data

US 2020/0073212 A1 Mar. 5, 2020

Related U.S. Application Data

(63) Continuation of application No. PCT/CN2017/090414, filed on Jun. 27, 2017.

(30) Foreign Application Priority Data

May 9, 2017 (CN) ..................... 2017 2 0512696 U

(51) Int. Cl.
*G03B 17/56* (2006.01)
*B64D 47/08* (2006.01)
(Continued)

(52) U.S. Cl.
CPC .......... *G03B 17/561* (2013.01); *B64D 47/08* (2013.01); *F16M 11/205* (2013.01);
(Continued)

(58) Field of Classification Search
CPC ... G03B 17/561; G03B 15/006; F16M 11/205
See application file for complete search history.

(56) References Cited

U.S. PATENT DOCUMENTS

| 9,749,544 | B2* | 8/2017 | Wang | ................. G03B 17/561 |
| 2017/0045807 | A1 | 2/2017 | Ye | |
| 2017/0336019 | A1* | 11/2017 | Liu | ..................... H05K 1/0281 |

FOREIGN PATENT DOCUMENTS

| CN | 205381413 U | 7/2016 |
| CN | 205738134 U | 11/2016 |

(Continued)

OTHER PUBLICATIONS

The World Intellectual Property Organization (WIPO) International Search Report for PCT/CN2017/090414 dated Aug. 17, 2017 6 pages.

*Primary Examiner* — Minh Q Phan
(74) *Attorney, Agent, or Firm* — Anova Law Group, PLLC

(57) ABSTRACT

A gimbal structure includes a camera assembly. The gimbal structure also includes a first motor configured to drive the camera assembly to rotate around a first rotation axis. The first motor includes a first stator. The first stator includes a first signal control cable. The gimbal structure also includes a second motor configured to drive the camera assembly to rotate around a second rotation axis perpendicular to the first rotation axis. The second motor includes a second stator. The second stator includes a second signal control cable. The gimbal structure further includes a motor housing configured for mounting the first stator and the second stator. The first signal control cable and the second signal control cable are combined to form a first cable structure.

10 Claims, 12 Drawing Sheets

(51) Int. Cl.
*F16M 11/20* (2006.01)
*G03B 15/00* (2006.01)
*H02K 5/22* (2006.01)
*B64C 39/02* (2006.01)

(52) U.S. Cl.
CPC ........... G03B 15/006 (2013.01); H02K 5/225 (2013.01); *B64C 39/024* (2013.01); *B64C 2201/127* (2013.01)

(56) References Cited

FOREIGN PATENT DOCUMENTS

CN 205916340 U 2/2017
WO WO-2015149370 A1 * 10/2015 ........... H04N 5/2254

* cited by examiner

GIMBAL STRUCTURE

CROSS-REFERENCE TO RELATED APPLICATIONS

This application is a continuation application of International Application No. PCT/CN2017/090414, filed on Jun. 27, 2017, which claims priority to Chinese Patent Application No. 201720512696.5, filed on May 9, 2017, the entire contents of both of which are incorporated herein by reference.

TECHNICAL FIELD

The present disclosure relates to the technology field of gimbals and more particularly, to a gimbal structure.

BACKGROUND

As the technologies advance, people place increasingly higher demands on the compactness, reliability, and high precision for electronic devices. In the field of aerial photography using unmanned aircrafts, there is technological trend to use smaller aircrafts and smaller gimbal cameras. The purpose is to make the photographing devices more convenient to carry.

Small aircrafts have limits on the carrying space and the payload. Thus, small gimbals and cameras are often selected as the photographing devices. In such situations, a microcontroller controls the motor and the data transmission from the camera through wires or cables. Due to the small size of the gimbal, there are several issues associated with configuring the cables through the structure of the gimbal. First, it is difficult to layout the cables or break the cables due to the limited space provided by the gimbal and the relatively large number of cables. Second, the number of components controlled by the gimbal structure is relatively large. This requires multiple signal channels to operate simultaneously. As a result, multiple routes of cables are provided on the gimbal. When the multiple routes of cables are not handled properly, they may cause a large rotation force, resulting in a waste in the driving force.

SUMMARY

In accordance with the present disclosure, there is provided a gimbal structure including a camera assembly. The gimbal structure also includes a first motor configured to drive the camera assembly to rotate around a first rotation axis. The first motor includes a first stator. The first stator includes a first signal control cable. The gimbal structure also includes a second motor configured to drive the camera assembly to rotate around a second rotation axis perpendicular to the first rotation axis. The second motor includes a second stator. The second stator includes a second signal control cable. The gimbal structure further includes a motor housing configured for mounting the first stator and the second stator. The first signal control cable and the second signal control cable are combined to form a first cable structure.

In various embodiments of the present disclosure, the gimbal structure includes a first stator of a first motor and a second stator of a second motor provided on a same component (e.g., housing of the motor). In addition, a first signal control cable of the first motor and a second signal control cable of the second motor are combined as a single cable (e.g., forming a first cable structure). By properly laying out the cables, interference due to the movements of the multiple routes of cables inside the gimbal may be avoided, and a torque on the cable structure caused by the movement of the camera components driven by the motor (first motor and second motor) can be reduced. Moreover, the rotational resistance caused by the cable structure to the gimbal can be reduced. Accordingly, the space of the gimbal is fully utilized and the operation life of the cables are increased.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
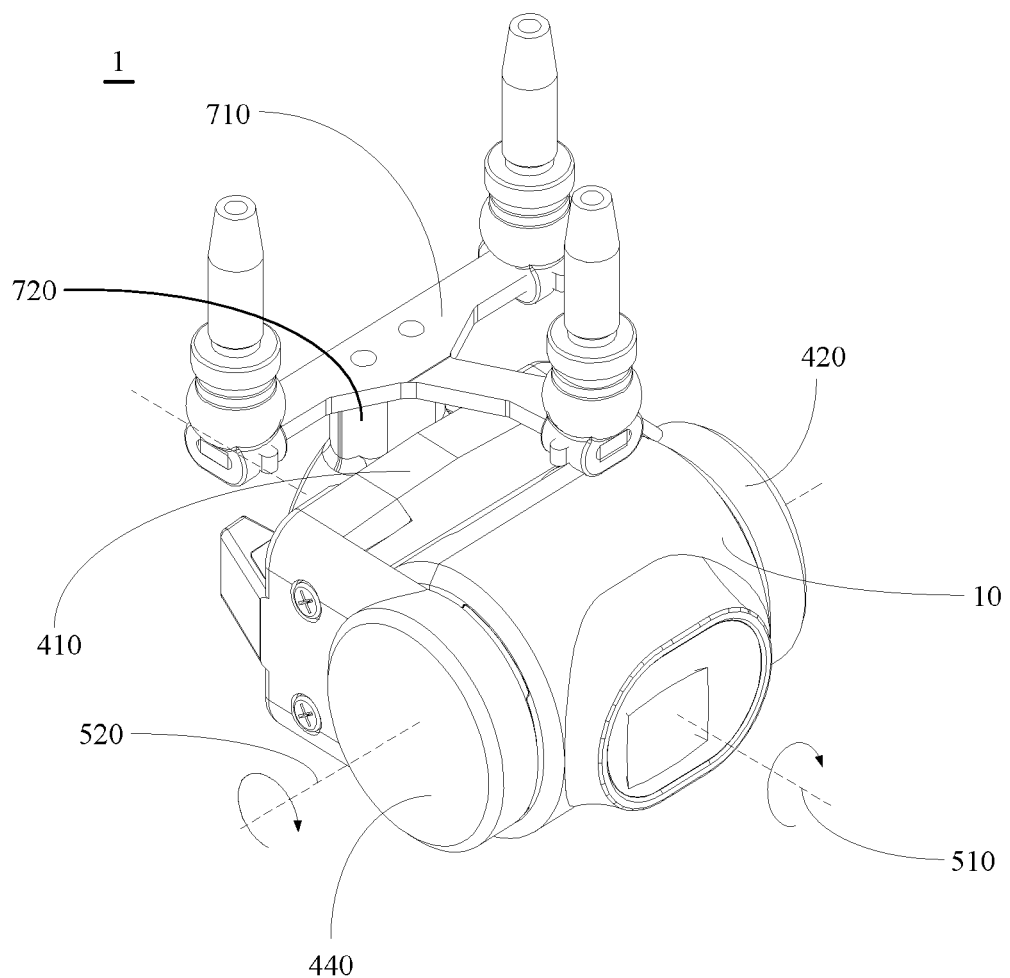
FIG. 1 is a perspective view of a gimbal structure, according to an example embodiment.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

The technical terms used in the present disclosure are only for describing certain embodiments, and are not intended to limit the scope of the present disclosure. In addition, the singular forms "a," "an," and "the" are intended to include the plural forms as well, unless the context indicates otherwise. The term "and/or" used herein includes any suitable combination of one or more related items listed.

The terms "first," "second," and similar terms used in the specification and the claims do not imply any order, quantity, or importance. They are used only for distinguishing different items or components. Similarly, "one" or "a" and similar terms do not limit the quantity of the item. Rather, they indicate that at least one item exists. Unless otherwise indicated, the terms "front," "rear," "lower portion," and/or "upper portion" and similar terms are only used for the convenience of description, and do not limit a position or location, or a space orientation. The terms "comprising" and/or "including" and similar terms indicate that the item appearing before these terms include the item appearing following these terms or equivalents of the items appearing following these terms. These terms do not exclude the inclusion of other components or items. The terms "connect" or "connection" and other similar terms do not limit the connection to be physical or mechanical connections. The connection may also include electrical connection. The connection may be direct connection or indirect connection. The connection may be permanent or detachable. The electrical connection may be wired or wireless.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used.

When a first component is referred to as "disposed," "located," or "provided" on a second component, the first component may be directly disposed, located, or provided on the second component or may be indirectly disposed, located, or provided on the second component via an intermediate component. The term "on" does not necessarily mean that the first component is located higher than the second component. In some situations, the first component may be located higher than the second component. In some situations, the first component may be disposed, located, or provided on the second component, and located lower than the second component. In addition, when the first item is disposed, located, or provided "on" the second component, the term "on" does not necessarily imply that the first component is fixed to the second component. The connection between the first component and the second component may be any suitable form, such as secured connection (fixed connection) or movable contact.

When a first component is referred to as "disposed," "located," or "provided" in a second component, the first component may be partially or entirely disposed, located, or provided in, inside, or within the second component. When a first component is coupled, secured, fixed, or mounted "to" a second component, the first component may be is coupled, secured, fixed, or mounted to the second component from any suitable directions, such as from above the second component, from below the second component, from the left side of the second component, or from the right side of the second component.

The terms "perpendicular," "horizontal," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure.

The symbol "/" means "or" between the related items separated by the symbol. The phrase "at least one of" A, B, or C encompasses all combinations of A, B, and C, such as A only, B only, C only, A and B, B and C, A and C, and A, B, and C.

When a first item is fixedly coupled, mounted, or connected to a second item, the term "fixedly" means "securely," and is relative to movably. When the first item is fixedly coupled, mounted, or connected to the second item, the first item does not move relative to the second item. The first item may be permanently coupled to the second item, or may be detachably coupled to the second item. When a first item is "fixed" with a second item, the first item is securely connected with the second item. The connection may be permanent or detachable.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined.

The following embodiments do not limit the sequence of execution of the steps included in the disclosed methods. The sequence of the steps may be any suitable sequence, and certain steps may be repeated.

As shown in FIG. 1 to FIG. 5, a gimbal structure 1 of the present disclosure may include a camera assembly 10, a first motor 20, a second motor 30, and a motor housing 40. The first motor 20 may be configured to drive the camera assembly 10 to rotate around a first rotation axis 510. The second motor 30 may be configured to drive the camera assembly 10 to rotate around a second rotation axis 520 that is perpendicular to the first rotation axis 510. The first motor 20 and the second motor 30 may form a motor assembly of the gimbal structure 1. During assembly, the motor assembly may be mounted to the motor housing 40 to complete the assembling of the motor housing 40 with the first motor 20 and the second motor 30.

Figure 2:
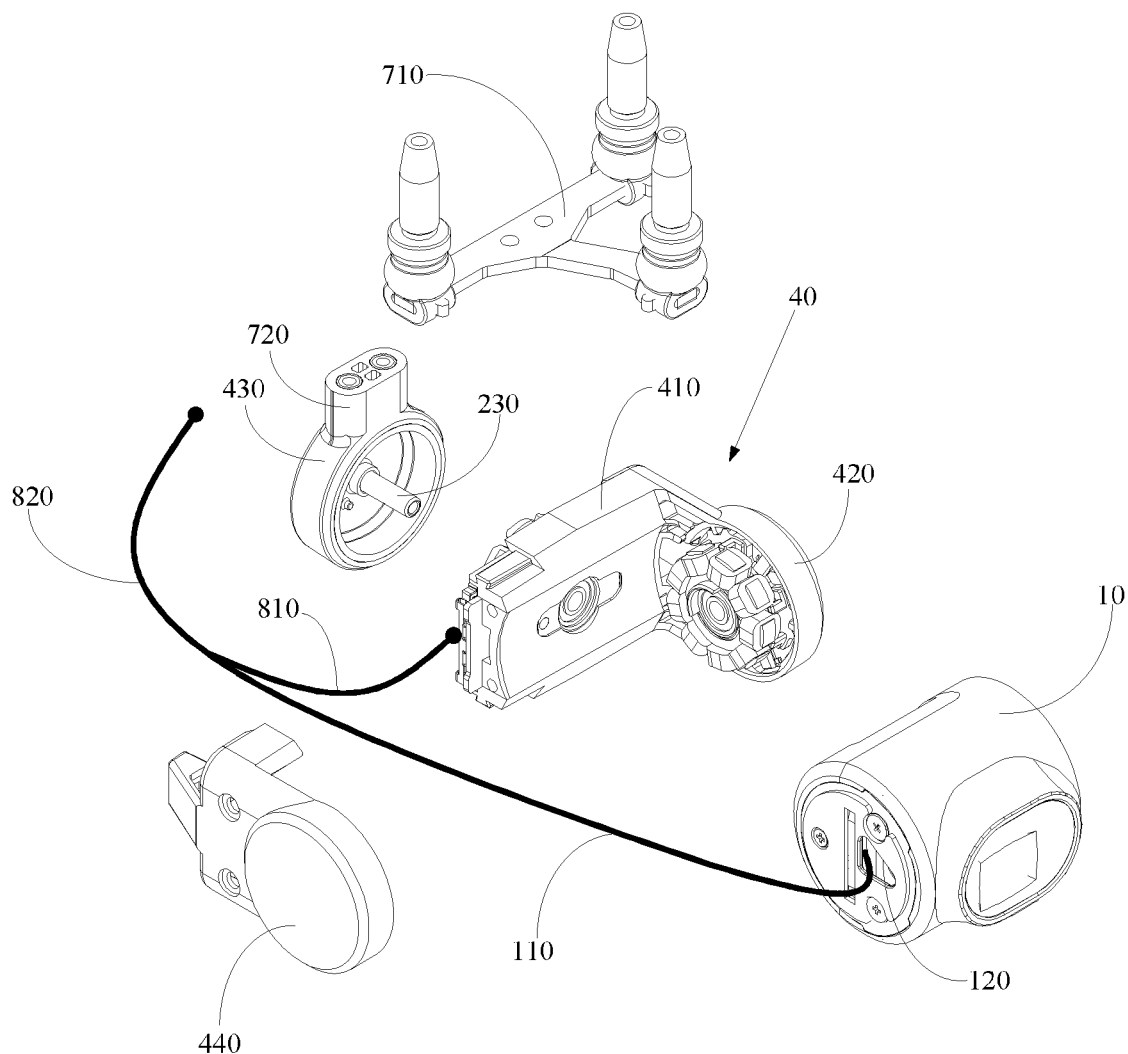
FIG. 2 is an exploded view of the gimbal structure from a first perspective, according to an example embodiment.

As shown in FIG. 6 to FIG. 9, the first motor 20 may include a first stator 210. The first stator 210 may include a first signal control cable. The second motor 30 may include a second stator 310. The second stator 310 may include a second signal control cable. In some embodiments, the first stator 210 and the second stator 310 may both be provided on the motor housing 40. The first signal control cable and the second signal control cable may be combined to form a first cable structure 810, as shown in FIG. 2.

In some embodiments, in the gimbal structure 1, the first stator 210 of the first motor 20 and the second stator 310 of the second motor 30 may be mounted to the same component (e.g., the motor housing 40). Thus, the first signal control cable of the first motor 20 and the second signal control cable of the second motor 30 may be combined to form a single cable structure (e.g., the first cable structure 810). Through this configuration of the cables of the gimbal structure 1 of the present disclosure, interference between the multiple routes of cables inside the gimbal during simultaneous movements can be reduced or avoided. In addition, the disclosed configuration of the cables can reduce the torque applied to the cables and the rotational resistance to the gimbal caused by the motor (e.g., first motor 20 and second motor 30) driving the camera assembly 10. The disclosed cable configuration fully utilized the small space in the gimbal, and increases the operation life of the cables.

Referring to FIG. 1, FIG. 4, FIG. 5, FIG. 10, and FIG. 11, in some embodiments, the motor housing 40 may include a first housing 410 disposed along the second rotation axis 520, and a second housing 420 disposed at a first end of the first housing 410 along the first rotation axis 510. The first housing 410 may include a first mounting member 411 for mounting the first stator 210. The second housing 420 may include a second mounting member 421 for mounting the second stator 310. In some embodiments, the first housing 410 and the second housing 420 may be an integrally formed device.

In some embodiments, after coupling the motor assembly comprised of the first motor 20 and the second motor 30 with the motor housing 40, the first stator 210 of the first motor 20 may be received in the first mounting member 411 of the first housing 410, and the second stator 310 of the second motor 30 may be received in the second mounting member 421 of the second housing 420. The first mounting member 411 and the second mounting member 421 not only function to receive the first stator 210 and the second stator 310, but also function to position the first motor 20 and the second motor 30.

Figure 3:
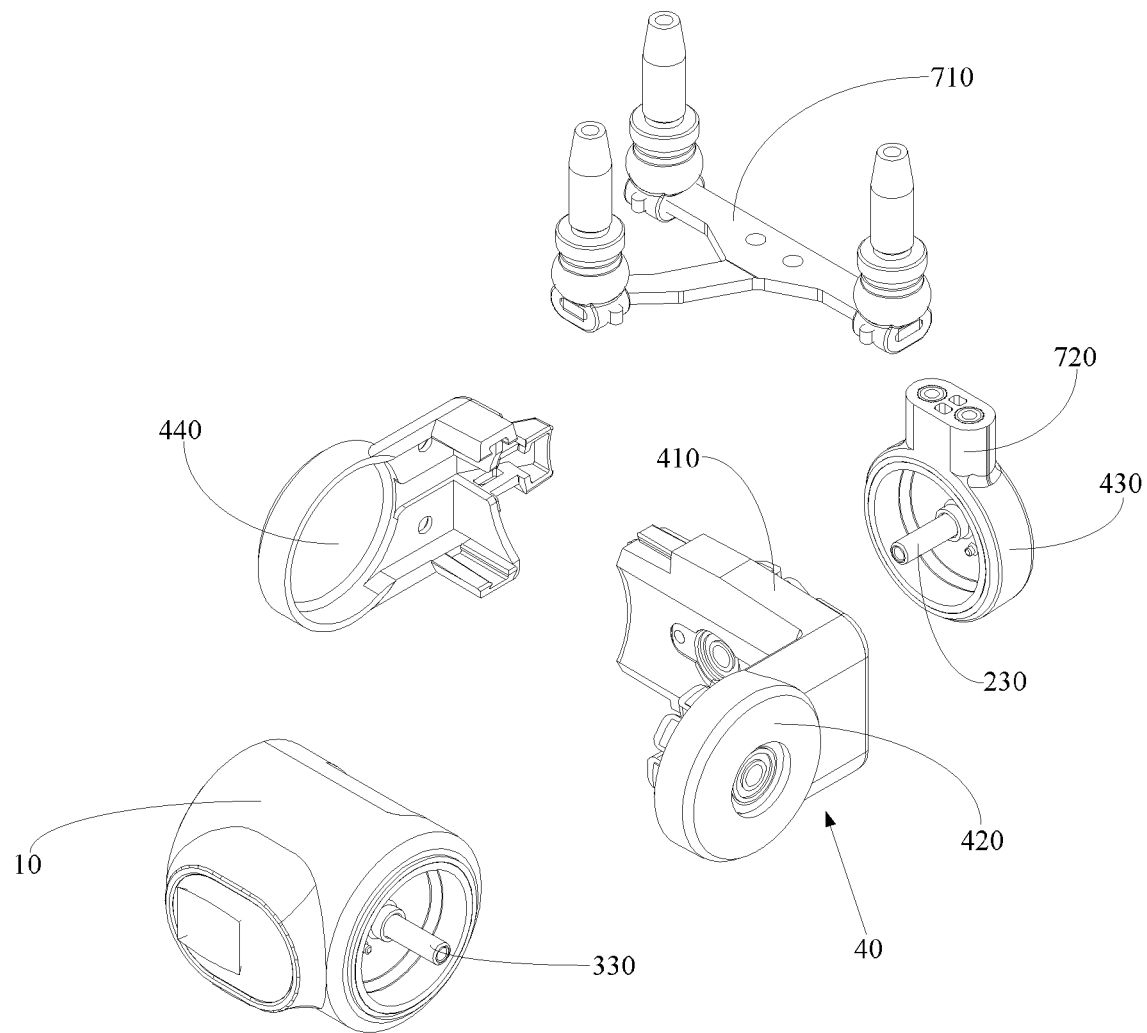
FIG. 3 is an exploded view of the gimbal structure from a second perspective, according to an example embodiment.

As shown in FIG. 2-FIG. 11, in some embodiments, the first motor 20 may include the first stator 210, a first rotor 220 provided on the first stator 210, and a first motor shaft 230 disposed on the first rotor 220. The first housing 410 of the motor housing 40 may include the first mounting member 411 configured to mount the first stator 210. The first mounting member 411 may include a first receiving member 412 configured to receive the first stator 220. The second motor 30 may include the second stator 310, a second rotor 320 mounted on the second stator 310, and a second motor shaft 330 mounted on the second rotor 320 (as shown in FIG. 3). The second housing 420 may include the second mounting member 421 configured to mount the second stator 310. The second mounting member 421 may include a second receiving member 422 configured to receive the second stator 320.

Figure 4:
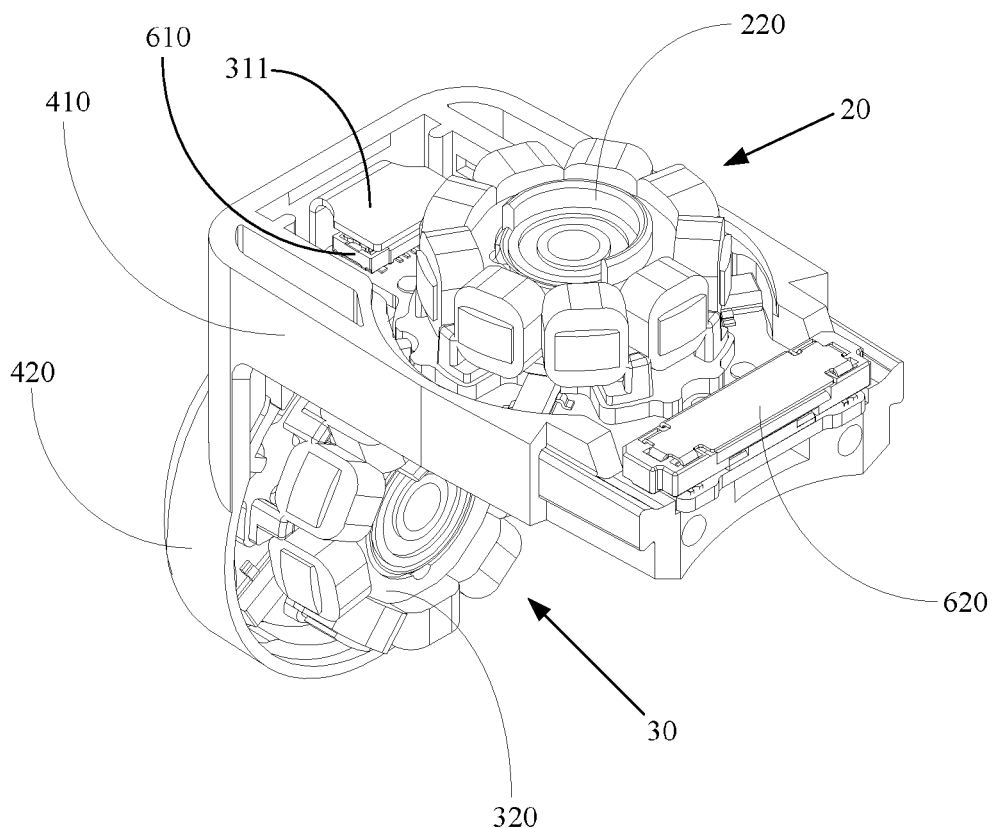
FIG. 4 is a perspective view of a motor housing and a motor assembly of the gimbal structure assembled together, according to an example embodiment.
Figure 5:
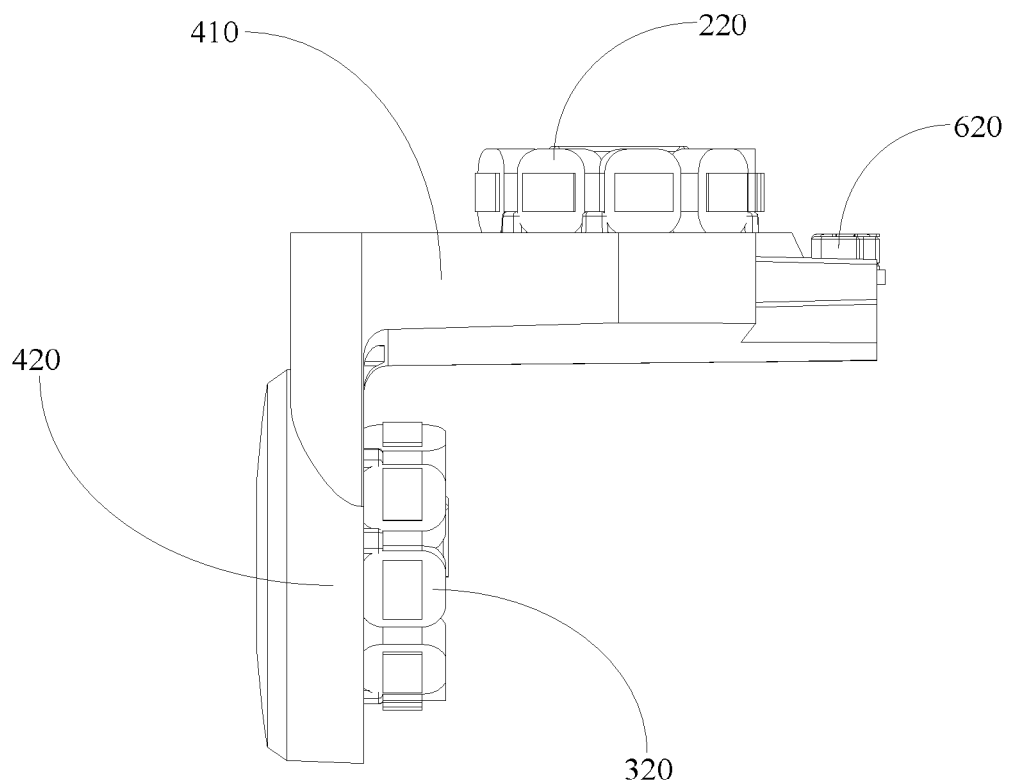
FIG. 5 is a plan view of a motor housing and a motor assembly of the gimbal structure assembled together, according to an example embodiment.
Figure 6:
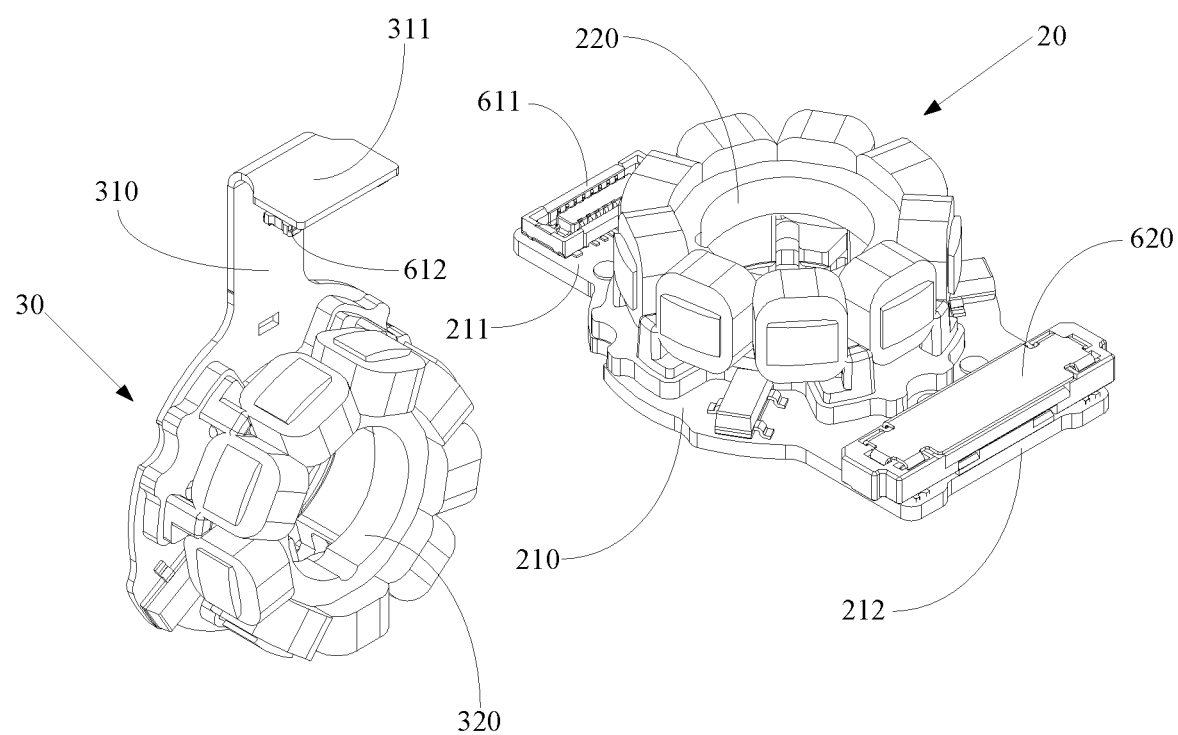
FIG. 6 is an exploded view of a motor assembly of the gimbal structure, according to an example embodiment.
Figure 7:
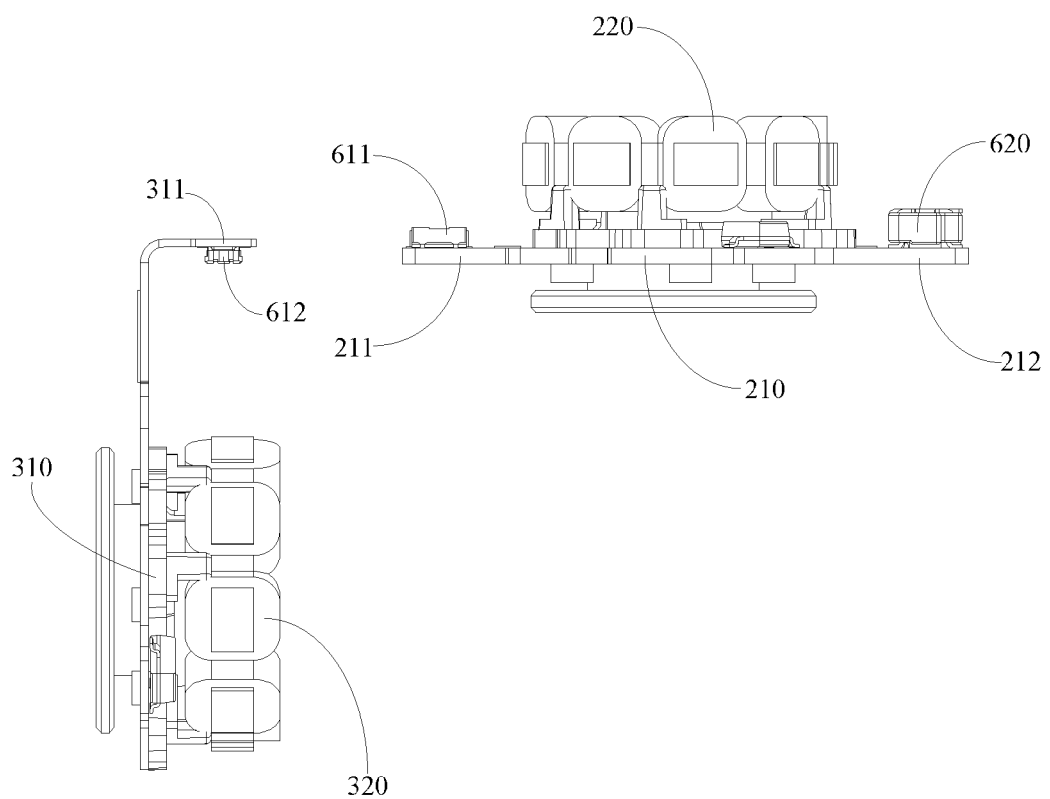
FIG. 7 is a side view of a motor assembly of the gimbal structure in a disassembled state, according to an example embodiment.
Figure 8:
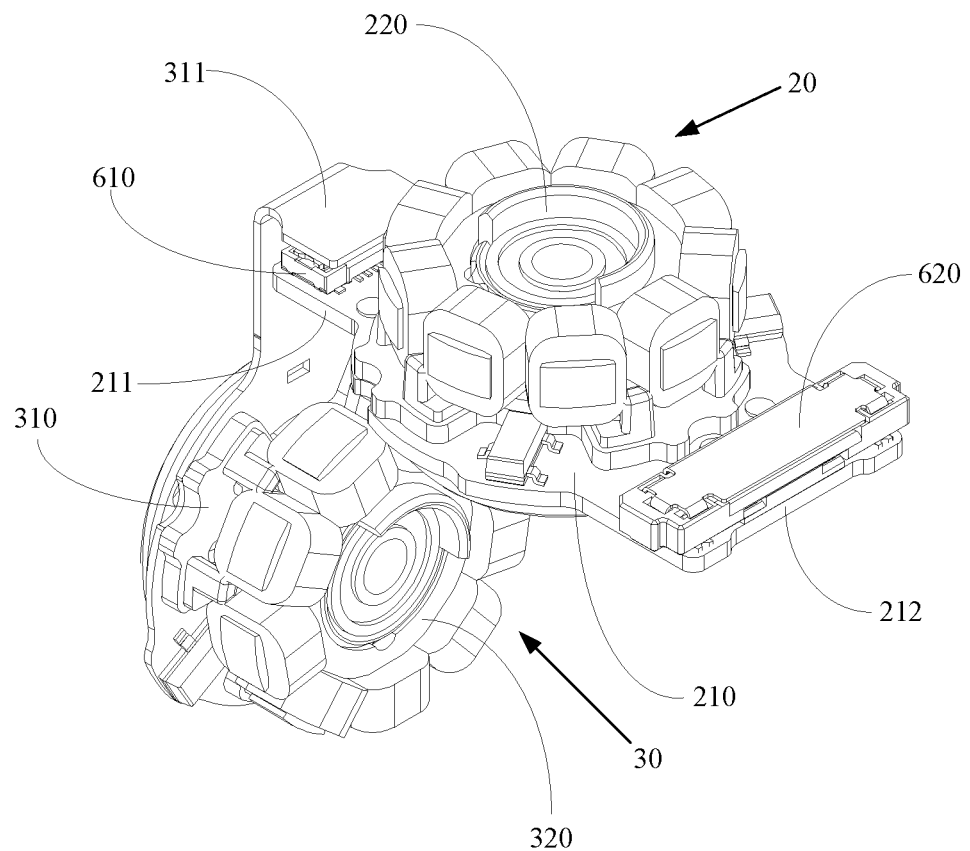
FIG. 8 is a perspective view of the motor assembly of the gimbal structure, according to an example embodiment.
Figure 9:
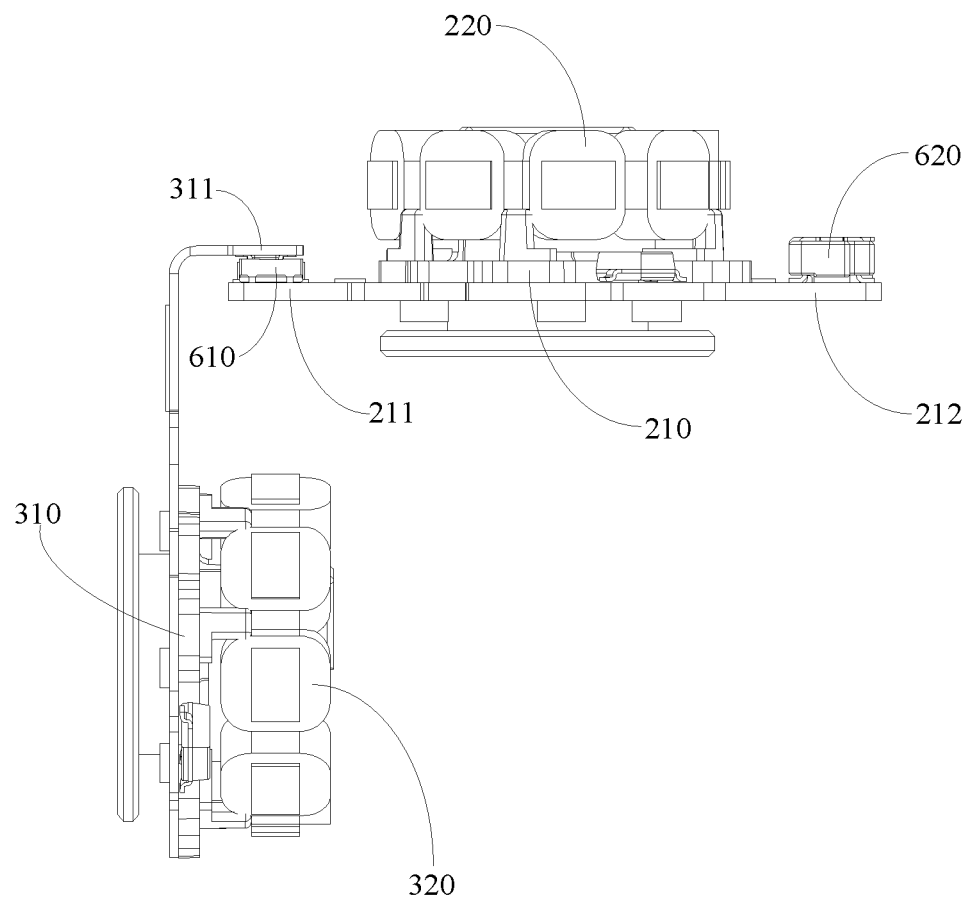
FIG. 9 is a plan view of the motor assembly of the gimbal structure, according to an example embodiment.

After coupling the motor assembly comprised of the first motor 20 and the second motor 30 with the motor housing 40, the first stator 210 of the first motor 20 may be received in the first mounting member 411 of the first housing 410. The first rotor 220 of the first motor 20 may be received in the first receiving member 412 of the first housing 410, and may partially protrude out of the first housing 410 (as shown in FIG. 4). The second stator 310 of the second motor 30 may be received in the second mounting member 421 of the second housing 420. The second rotor 320 of the second motor 30 may be received in the second receiving member 422 of the second housing 420, and may partially protrude out of the second housing 420 (as shown in FIG. 4). The first mounting member 411 and the second mounting member 421 not only function to receive the first stator 210 and the second stator 310, but also function to position the first motor 20 and the second motor 30. In some embodiments, because the first rotor 220 of the first motor 20 partially protrudes, from the first receiving member 412, out of the second housing 420, and the second rotor 320 of the second motor 30 partially protrudes, from the second receiving member 422, out of the second housing 420, the first receiving member 412 and the second receiving member 422 not only function to receive the first rotor 220 and the second rotor 320, but also function to position the first motor 20 and the second motor 30.

In some embodiments, as shown in FIG. 1-FIG. 4, the motor housing 40 may include a third housing 430 and a fourth housing 440. The third housing 430 may cover at least a portion of the first rotor 220 that protrudes out of the first housing 410. The third housing 430 may be connected with the first motor shaft 230. In some embodiments, an end of the first motor shaft 230 may be connected with the third housing 430. The other end of the first motor shaft 230 may penetrate through the first housing 410 to connect with the camera assembly 10, and may cause the camera assembly 10 to rotate around the first rotation axis 510. The fourth housing 440 may be disposed at a second end of the first housing 410 along the first rotation axis 510. The camera assembly 10 may be disposed between the second housing 420 and the fourth housing 440, and may be connected with the second motor shaft 330. The second motor shaft 330 may cause the camera assembly 10 to rotate around the second rotation axis 520.

As shown in FIG. 6-FIG. 9, in some embodiments, the gimbal structure 1 may include a first connector 610 disposed between the first stator 210 and the second stator 310. The second signal control cable may be combined with the first signal control cable through the first connector 610 to form the first cable structure 810. In some embodiments, the first connector 610 may be a co-axial connector.

In some embodiments, the first stator 210 may include a first connecting member 211 that may be provided with a first cable entry port. The second stator 310 may include a second connecting member 311 that may be disposed in a bent shape. The second connecting member 311 disposed in a bent shape may be connected with the first connecting member 211 of the first stator 210. The second connecting member 311 may be provided with a first cable exiting port. The first connector 610 may connect between the first cable exiting port and the first cable entry port. The second signal control cable may extend out of the second stator 310 through the first cable exiting port of the second connecting member 311. The second signal control cable may extend into the first stator 210 from the first cable entry port of the first connecting member 211 through the first connector 610, thereby combining with the first signal control cable to form the first cable structure 810.

In some embodiments, the first connector 610 may include a first connecting port 611 and a second connecting port 612 that are connected together. The first connecting port 611 may be disposed on the first connecting member 211 of the first stator 210, and may be connected with the first cable entry port. The second connecting port 612 may be disposed on the second connecting member 311 of the second stator 310, and may be connected with the first cable exiting port.

Figure 10:
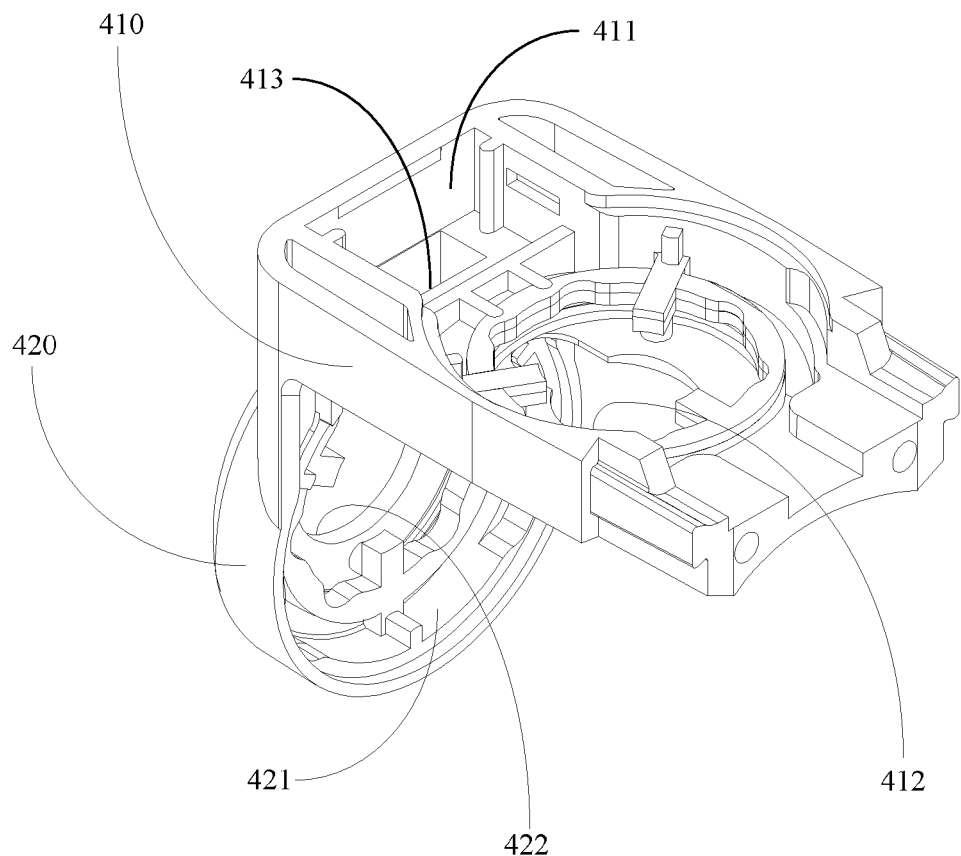
FIG. 10 is a perspective view of the motor housing of the gimbal structure, according to an example embodiment.
Figure 11:
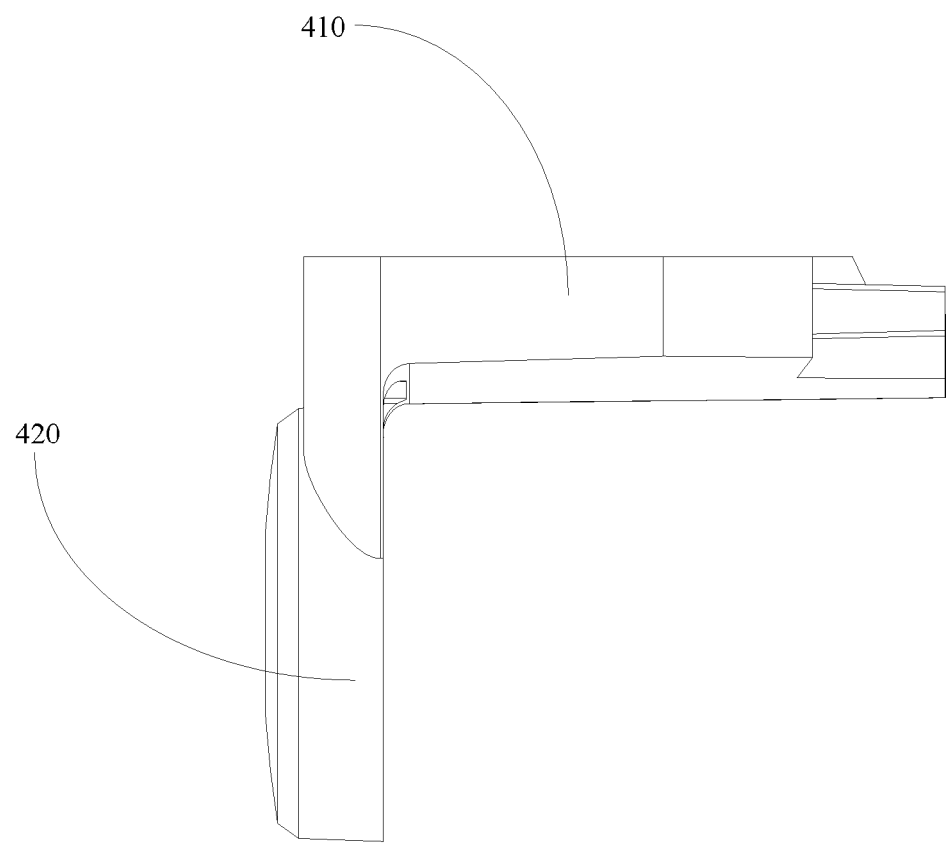
FIG. 11 is a plan view of the motor housing of the gimbal structure, according to an example embodiment.

As shown in FIG. 10, in some embodiments, the first housing 410 may be provided with a connecting hole 413. When the first motor 20 and the second motor 30 are mounted to the motor housing 40, the first connecting port 611 and the second connecting port 612 of the first connector 610 may be connected together at the connecting hole 413. As a result, the second signal control cable, after being connected with the second stator 310, extends into the first stator 210 through the first connector 610, and combines with the first signal control cable to form the first cable structure 810.

The mounting of the first motor 20 and the second motor 30 to the motor housing 40 will be described below with reference to FIG. 4-FIG. 11. Firstly, the first motor 20 may be mounted to the first housing 410 from above the first housing 410, such that the first stator 210 of the first motor 20 is received in the first mounting member 411 of the first housing 410, and the first rotor 220 of the first motor 20 is received in the first receiving member 412 of the first housing 410 and a portion of the first rotor 220 protrudes out of the first housing 410. Then, the second connecting member 311 of the second motor 30 is inserted through the connecting hole 413 of the first housing 410 from under the first housing 410, such that the first connecting port 611 and the second connecting port 612 of the first connector 610 are connected together. Finally, the second motor 30 may be mounted to the second housing 420 from the right side of the second housing 420, such that the second stator 310 of the second motor 30 is received in the second mounting member 421 of the second housing 420, and the second rotor 320 of the second motor 30 is received in the second receiving member 422 of the second housing, and a portion of the second rotor 320 protrudes out of the second housing 420. This concludes the mounting of the first motor 20 and the second motor 30 onto the motor housing 40.

As shown in FIG. 2-FIG. 12, in some embodiments, the camera assembly 10 includes a camera signal control cable 110. The gimbal structure 1 may include a second connector 620 disposed on the first stator 210. The first cable structure 810 extends out of the first stator 210 through the second connector 620 to combine with the camera signal control cable 110 to form a second cable structure 820. The second cable structure 820 may extend out of the motor housing 40 to connect with an external device. In some embodiments, the second connector 620 may be a co-axial connector.

Through the above configurations, in the gimbal structure 1 of the present disclosure, the first cable structure 810 may be combined with the camera signal control cable 110 to form the second cable structure 820. That is, the first signal control cable of the first motor 20, the second signal control cable of the second motor 30, and the camera signal control cable 110 of the camera assembly 10 may be combined into a single thread (i.e., to form the second cable structure 820), thereby realizing combing all of the cables disposed inside the motor housing 40 into a single thread. This optimizes the cable configuration of inside the gimbal, and can avoid interference between multiple routes of cables when the cables move simultaneously. The disclosed configuration can also reduce the torque applied on the cables when the motor (e.g., the first motor 20 and the second motor 30) drives the camera assembly 10 to move, and reduce the rotational resistance applied to the gimbal by the cables. The disclosed configuration may also fully utilize the space and effectively increase the life time of the cables.

In some embodiments, the first stator 210 may include a third connecting member 212. The third connecting member 212 may include a second cable exiting port. The second connector 620 may be disposed on the third connecting member 212 and connected with the second cable exiting port. The first cable structure 810 may extend out of the first stator 210 through the second cable exiting port and the second connector 620. In some embodiments, the camera assembly 10 may include a camera cable exiting port 120. The camera signal control cable 110 may extend out of the camera assembly 10 through the camera cable exiting port 120.

Figure 12:
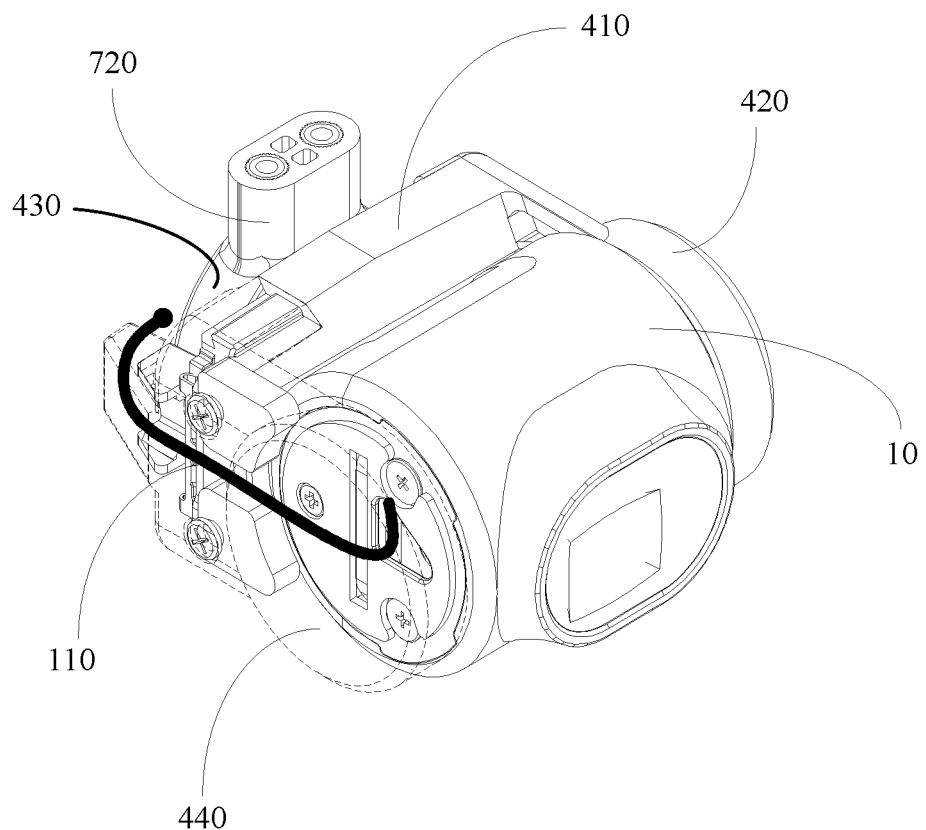
FIG. 12 is a schematic illustration of the cable routing of a camera assembly of the gimbal structure, according to an example embodiment.

As shown in FIG. 1, FIG. 2, and FIG. 12, in some embodiments, the gimbal structure 1 may be a dual-axis gimbal. The first rotation axis 510 may be a roll axis of the gimbal structure 1, the second rotation axis 520 may be a pitch axis of the gimbal structure 1. In some embodiments, the gimbal structure 1 may include a vibration reduction panel 710 configured to connect the gimbal structure 1 with other external devices. In some embodiments, the third housing 430 of the motor housing 40 may be provided with a connecting assembly 720. The vibration reduction panel 710 may be mounted to the third housing 430 of the motor housing 40 through the connecting assembly 720.

A person having ordinary skills in the art can appreciate that the above descriptions merely describe some embodiments of the present disclosure, and do not limit the scope of the present disclosure in any manner. Any person having ordinary skills in the art can make modifications, variations, or replacements based on the disclosed technology without departing from the scope of the present disclosure. Such modifications, variations, or replacements are equivalent embodiments of the present disclosure, and fall within the scope of the present disclosure. The scope of the present disclosure is defined by the following claims and the equivalents.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:
1. A gimbal structure, comprising:
a camera assembly;
a first motor configured to drive the camera assembly to rotate around a first rotation axis, the first motor comprising a first stator, the first stator comprising a first signal control cable and a first cable entry port;
a second motor configured to drive the camera assembly to rotate around a second rotation axis perpendicular to the first rotation axis, the second motor comprising a second stator, the second stator comprising a second signal control cable and a first cable exiting port;
a first connector disposed between the first cable exiting port and the first cable entry port; and
a motor housing configured for mounting the first stator and the second stator,
wherein the second signal control cable extends out of the second stator through the first cable exiting port, and extends into the first stator from the first cable entry port through the first connector to combine with the first signal control cable to form a first cable structure.

2. The gimbal structure of claim 1,
wherein the motor housing comprises a first housing disposed along the second rotation axis and a second housing disposed at a first end of the first housing along the first rotation axis,
wherein the first housing comprises a first mounting member configured for mounting the first stator, and
wherein the second housing comprises a second mounting member configured for mounting the second stator.

3. The gimbal structure of claim 2,
wherein the first motor comprises a first rotor and a first motor shaft,
wherein the first mounting member comprises a first receiving member configured to receive the first rotor,
wherein the second motor comprises a second rotor and a second motor shaft, and
wherein the second mounting member comprises a second receiving member configured to receive the second rotor.

4. The gimbal structure of claim 3,
wherein the first rotor is configured to protrude out of the first housing from the first receiving member, and
wherein the motor housing comprises a third housing covering the first rotor and connected with the first motor shaft.

5. The gimbal structure of claim 3,
wherein the motor housing comprises a fourth housing disposed at a second end of the first housing along the first rotation axis, and
wherein the camera assembly is disposed between the second housing and the fourth housing, and is connected with the second motor shaft.

6. The gimbal structure of claim 1,
wherein the first connector comprises a first connecting port and a second connecting port connected with one another,
wherein the first connecting port is disposed on the first stator and connected with the first cable entry port, and
wherein the second connecting port is disposed on the second stator and connected with the first cable exiting port.

7. The gimbal structure of claim 1,
wherein the camera assembly comprises a camera signal control cable,
wherein the gimbal structure further comprises a second connector disposed on the first stator, and
wherein the first cable structure extends out of the first stator through the second connector and combines with the camera signal control cable to form a second cable structure.

8. The gimbal structure of claim 7,
wherein the camera assembly comprises a camera cable exiting port, and
wherein the camera signal control cable extends out of the camera assembly from the camera cable exiting port.

9. The gimbal structure of claim 1,
wherein the first rotation axis is a roll axis of the gimbal structure, and the second rotation axis is a pitch axis of the gimbal structure.

10. A gimbal structure, comprising:
a camera assembly comprising a camera signal control cable;
a first motor configured to drive the camera assembly to rotate around a first rotation axis, the first motor comprising a first stator, the first stator comprising a first signal control cable;
a second motor configured to drive the camera assembly to rotate around a second rotation axis perpendicular to the first rotation axis, the second motor comprising a second stator, the second stator comprising a second signal control cable;
a first connector disposed between the first stator and the second stator;
a second connector disposed on the first stator; and
a motor housing configured for mounting the first stator and the second stator,
wherein:
the second signal control cable is combined with the first signal control cable through the first connector to form a first cable structure, and
the first cable structure extends out of the first stator through the second connector and combines with the camera signal control cable to form a second cable structure.

* * * * *